(12) United States Patent
Kim et al.

(10) Patent No.: US 9,511,713 B2
(45) Date of Patent: Dec. 6, 2016

(54) SIDE VIEW MIRROR HAVING ROTATABLE HOUSING

(71) Applicants: Hyundai Motor Company, Seoul (KR); Kia Motors Corporation, Seoul (KR); SMR Poong Jeong Automotive Mirrors Korea Ltd., Chungcheongbuk-Do (KR)

(72) Inventors: Ill Soo Kim, Suwon-si (KR); Jong Sik Bae, Suwon-si (KR); Chan Mook Choi, Incheon (KR); Chang Seok Lee, Incheon (KR); Dong Young Jang, Bucheon-si (KR); Kyoung Joon Lee, Seoul (KR); Myung Ho Jung, Bucheon-si (KR)

(73) Assignees: Hyundai Motor Company, Seoul (KR); Kia Motors Corporation, Seoul (KR); SMR Poong Jeong Automotive Mirrors Korea Ltd., Cheongju-si, Chungcheongbuk-do (KR)

( * ) Notice: Subject to any disclaimer, the term of this patent is extended or adjusted under 35 U.S.C. 154(b) by 24 days.

(21) Appl. No.: 14/508,803

(22) Filed: Oct. 7, 2014

(65) Prior Publication Data
US 2015/0098144 A1 Apr. 9, 2015

(30) Foreign Application Priority Data

Oct. 8, 2013 (KR) .................... 10-2013-0119709

(51) Int. Cl.
*G02B 5/08* (2006.01)
*G02B 7/18* (2006.01)
(Continued)

(52) U.S. Cl.
CPC .................... *B60R 1/064* (2013.01)

(58) Field of Classification Search
CPC ........... G02B 7/182; G02B 7/023; G02B 5/08; B60R 1/06; B60R 1/074; B60R 1/076; B60R 1/0617; B60R 1/064
(Continued)

(56) References Cited

U.S. PATENT DOCUMENTS

| 4,636,045 A * | 1/1987 | Suzuki | B60R 1/066 248/481 |
| 4,867,409 A * | 9/1989 | Fimeri | B60R 1/066 248/481 |

FOREIGN PATENT DOCUMENTS

| JP | 09-136574 A | 5/1997 |
| JP | 2001-301529 A | 10/2001 |

(Continued)

*Primary Examiner* — Jade R Chwasz
(74) *Attorney, Agent, or Firm* — McDermott Will & Emery LLP (57) ABSTRACT

A side view mirror having a rotatable housing comprises a cover plate mounted on an exterior of a vehicle body, wherein an inside and outside of the cover plate are divided based on the vehicle body. A stay includes a lever disposed at an inner side of the cover plate. An up/down/left/right angle adjusting part is integrated with a connection bar, connected to the lever through the connection bar, and configured to be movable in up/down and left/right directions with respect to an outer surface of the cover plate. A folding supporting part is integrated with the up/down/left/right angle adjusting part at the outer surface of the up/down/left/right angle adjusting part and connected to the mirror-integrated housing. A mirror-integrated housing is foldably or unfoldably coupled with the folding supporting part, and an angle of the mirror-integrated housing is adjusted in up/down and left/right directions by the up/down/left/right angle adjusting part.

6 Claims, 10 Drawing Sheets

SECTIONAL VIEW CUT ALONG LINE A-A (51) Int. Cl.
*G02B 7/182* (2006.01)
*B60R 1/064* (2006.01)
(58) Field of Classification Search
USPC ................ 359/841, 843, 844, 871, 872, 882
See application file for complete search history.

(56) References Cited

FOREIGN PATENT DOCUMENTS

| | | | |
|---|---|---|---|
| JP | 2005-254969 A | 9/2005 |
| KR | 10-1999-0032000 A | 5/1999 |
| KR | 10-2005-0009450 A | 1/2005 |
| KR | 10-2005-0052530 A | 6/2005 |

\* cited by examiner

FIG.1A

- Prior Art -

SECTIONAL VIEW CUT ALONG LINE D-D

FIG.1B

- Prior Art -

SECTIONAL VIEW CUT ALONG LINE A-A

SIDE VIEW MIRROR HAVING ROTATABLE HOUSING

CROSS-REFERENCE TO RELATED APPLICATION

This application claims under 35 U.S.C. §119(a) the benefit of priority to Korean Patent Application No. 10-2013-0119709 filed on Oct. 8, 2013, the entire contents of which are incorporated herein by reference.

TECHNICAL FIELD

The present disclosure relates to a side view mirror having a rotatable housing. More particularly, the present disclosure relates to a side view mirror having a rotatable housing, in which the housing is integrated with mirror and which enables a user to easily adjust an angle of the housing and the mirror inside a vehicle by using a lever.

BACKGROUND

As well known, side view mirrors of a vehicle are essential for driving in order for a driver to safely change lanes and to detect rear vehicles.

An electric adjustment method for adjusting an angle of a side view mirror of a vehicle using an actuator module is available, which enables a driver to adjust the angle of the mirror by manipulating a button inside the vehicle. A cable adjustment method enables a driver to adjust the angle of the mirror using a cable connected to the inside of a vehicle. A manual adjustment method has been used in which a driver manually adjusts the angle of the mirror outside a vehicle.

An electric folding method using an electric unit and a manual folding method using shafts, springs, etc. have been used to fold side view mirrors.

The electric adjustment method of enabling a driver to adjust the angle of the mirror by manipulating the button inside the vehicle is commonly used, however, lower-cost vehicles or commercial vehicles still use the manual adjustment method.

Figure 1A:
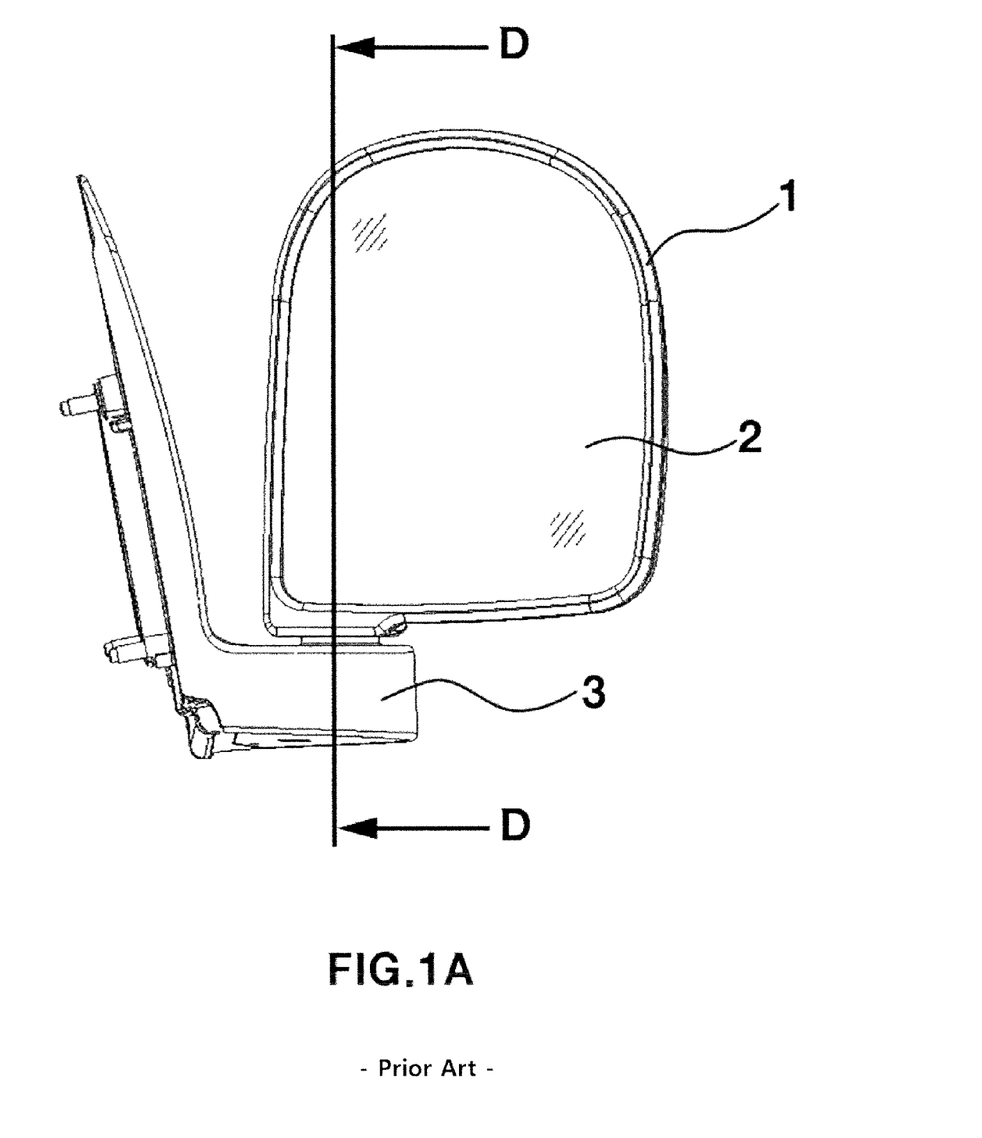
FIG. 1A illustrates an example of a manually adjustable side view mirror according to the related art.
Figure 1B:
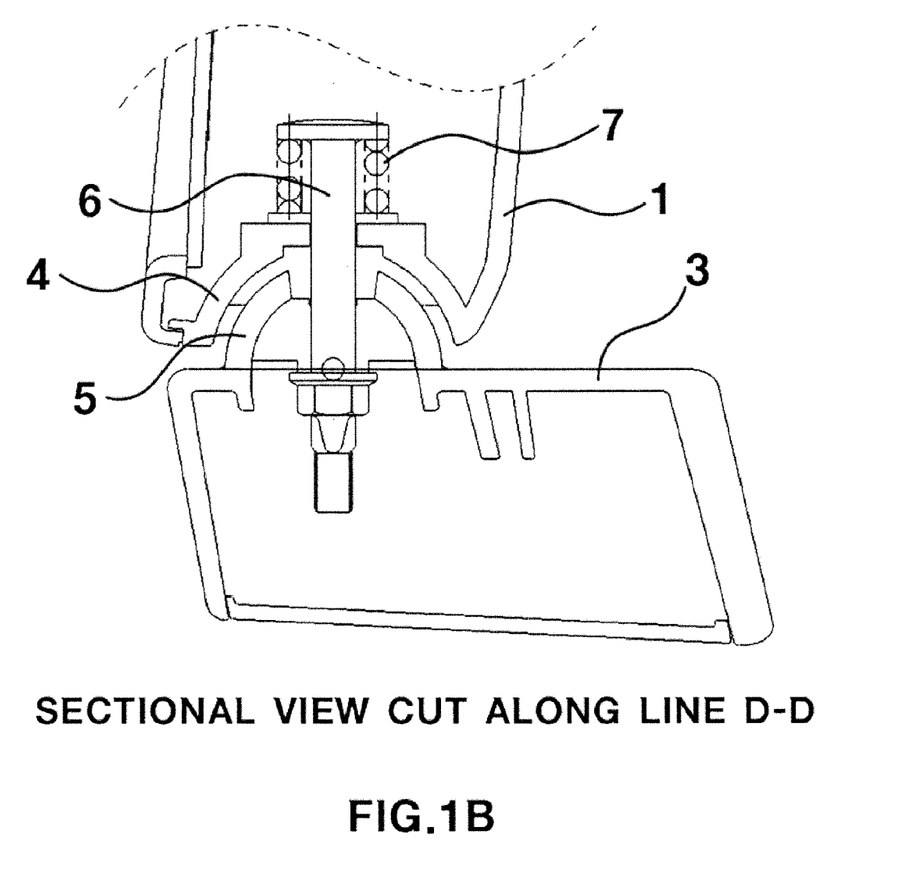
FIG. 1B is a cross-sectional view of a manually adjustable side view mirror cut along a line D-D of FIG. 1.

FIGS. 1A and 1B illustrate a side view mirror based on a manual adjustment method according to the related art.

In FIGS. 1A and 1B, a reference numeral 1 represents a housing of a side view mirror, and a reference numeral 2 represents an adjustable mirror installed in the housing 1.

The mirror 2 is mounted in the opening of the housing 1, and the housing 1 is provided to protect the mirror 2 from being damaged or from shock caused by outside obstacles. The housing 1 has a structure that is rotatable up/down and left/right directions in 360 degrees and is attached on a cover 3 of a vehicle body (specifically, a door panel).

Further, a cap 4 having a half concave ball shape is provided in the lower part of the housing 1. A bracket 5 having a convex ball shape is inserted into and coupled with the cap 4 in the upper part of the cover 3.

The cap 4 of the housing 1 and the bracket 5 of the cover 3 are coupled with each other through a shaft 6 by bolt fastened, and a spring 7 is compressively interposed between a top of the shaft 6 and a top of the cap 4.

The housing 1 is fixed by the spring 7 with respect to the cover 3, and the tension of the spring 7 varies by a tightening torque of a bolt which is to couple the shaft 6.

Accordingly, in order to obtain an adequate side view, a driver needs to adjust the mirror 2 in the housing 1 provided outside the vehicle. Also, in order to protect a pedestrian when the side view mirror collides with the pedestrian, the housing 1 can rotate according to the applied force to be folded or unfolded.

That is, when an external pressure is applied to the housing 1 from the outside of the vehicle, the housing 1 rotates with respect to the shaft 6 to be folded or unfolded, and at this time, the cap 4 slides along the surface of the bracket 5 since the cap 5 is ball-jointed with the bracket 5.

However, the manual adjustment method for side view mirrors as described above is inconvenient because the driver need to manually adjust the angle of the mirror outside the vehicle and fold or unfold the side view mirrors.

In other words, the driver may need to stretch out to adjust the angle of the mirror after opening the window of the vehicle or get out of the vehicle to adjust the angle of the mirror. Also, since the driver touches the mirror with his/her hand, the surface of the mirror may get fingerprint stain.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art.

An aspect of the present disclosure is to provide a side view mirror of a vehicle having a rotatable housing, in which the housing is integrated with the mirror, and a lever connected to the housing to be angle-adjusted is installed inside a vehicle so that a driver can easily adjust an angle of the housing (that is, an angle of the mirror) by manipulating the lever inside the vehicle to obtain his/her desired view.

According to an embodiment of the present invention, a side view mirror having a rotatable housing includes a cover plate mounted on an exterior of a vehicle body, wherein an inside and outside of the cover plate are divided based on the vehicle body. A stay penetrates the cover plate and comprises a lever disposed in the inside of the cover plate. An up/down/left/right angle adjusting part is connected to the lever through a connection bar, and integrated with the connection bar to be movable in up/down and left/right directions with respect to an outer surface of the cover plate. A folding supporting part is integrated with the up/down/left/right angle adjusting part at an outer surface of the up/down/left/right angle adjusting part and connected to the mirror-integrated housing. A mirror-integrated housing is foldably or unfoldably coupled with the folding supporting part. An angle of the mirror-integrated housing is adjusted in the up/down and left/right directions by the up/down/left/right angle adjusting part.

The up/down/left/right angle adjusting part has a hemispherical ball shape that is convex toward the inside of the cover plate, and a concave hemispherical groove with which the hemispherical ball is ball-jointed is formed in the inside of the cover plate.

A spring supporting hook is integrated with the connection bar on a circumference of the connection bar. A first spring is compressively disposed between the spring support hook and the cover plate.

In a state where a lower portion of an installation part formed in an inner lateral side of the mirror-integrated housing tightly contacts an upper portion of the folding supporting part. A folding shaft, which acts as a rotation axis of the mirror-integrated housing, is disposed inside of the folding supporting part and the installation part of the housing to connect the folding supporting part and the installation part.

A spring coupling groove is formed in a lower portion of the folding supporting part. A second spring, which is compressively supported by a head 36 of the folding shaft, is inserted in the spring coupling groove.

A plurality of first resting protrusions protrude at a predetermined interval from an upper portion of the folding supporting part. A plurality of second resting protrusions that are arranged between the first resting protrusions protrude from a lower portion of an installation part of the mirror-integrated housing.

A first folding limiting protrusion to limit a folding angle of the glass-integrated housing protrudes from an outer circumference of the first resting protrusions of the folding supporting part. A pair of second folding limiting protrusions protrude from an outer circumference of the second resting protrusions of the mirror-integrated housing. The first folding limiting protrusion is disposed between the pair of second folding limiting protrusions.

Other aspects and embodiments of the invention are discussed infra.

It is understood that the term "vehicle" or "vehicular" or other similar term as used herein is inclusive of motor vehicles in general, such as passenger automobiles including: sports utility vehicles (SUV); buses; trucks; various commercial vehicles; watercraft including, a variety of boats and ships, aircraft, and the like, and includes hybrid vehicles; electric vehicles; plug-in hybrid electric vehicles; hydrogen-powered vehicles; and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 2:
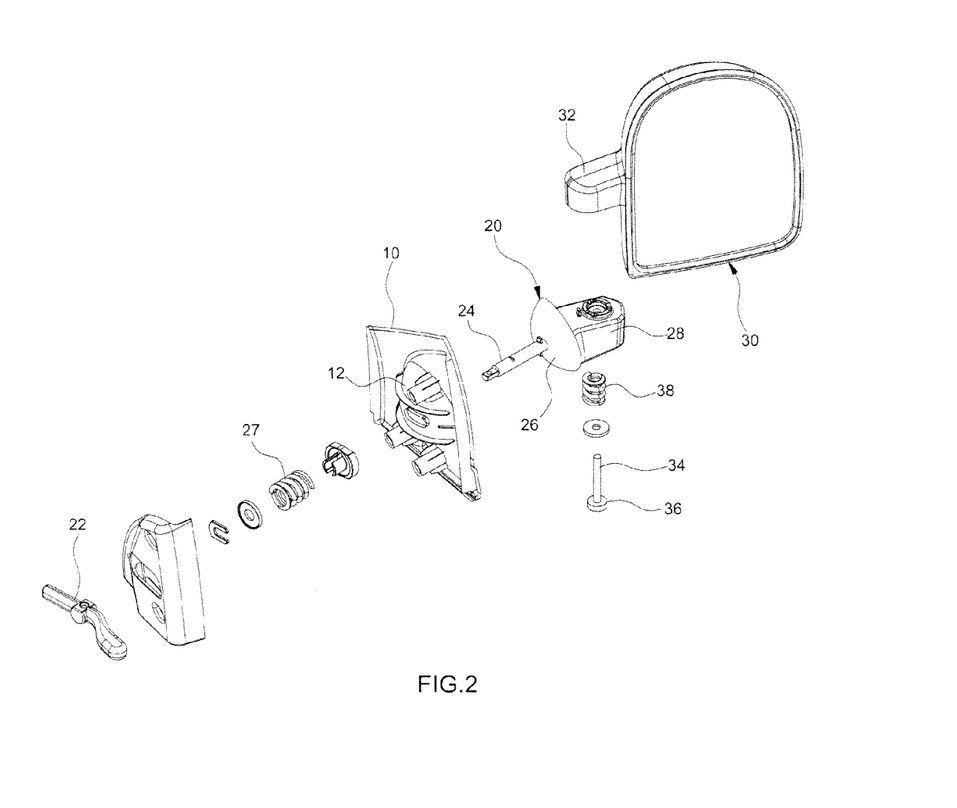
FIG. 2 is an exploded perspective view of a side view mirror having a rotatable housing, according to an embodiment of the present disclosure.
Figure 3:
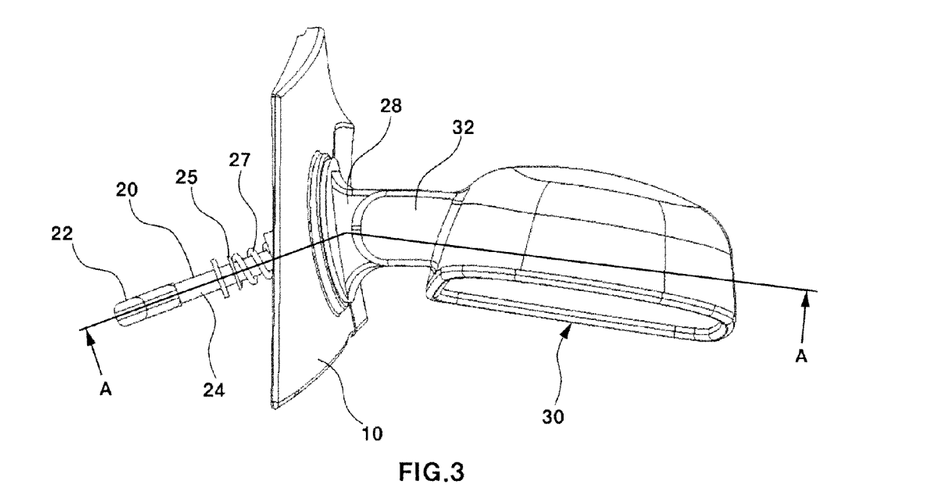
FIGS. 3 and 4 are perspective views of a side view mirror having a rotatable housing, according to an embodiment of the present disclosure, seen from different viewpoints.
Figure 4:
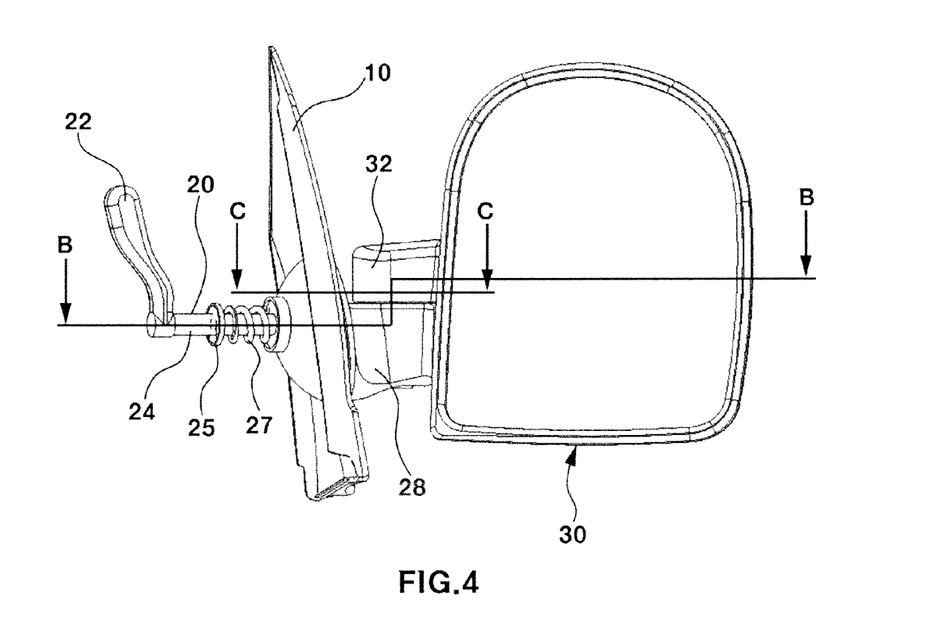

FIG. 2 is an exploded perspective view of a side view mirror having a rotatable housing, according to an embodiment of the present disclosure. FIGS. 3 and 4 are perspective views of a side view mirror having a rotatable housing, according to an embodiment of the present disclosure.

In FIGS. 2, 3, and 4, a reference numeral 30 represents a mirror-integrated housing.

The mirror-integrated housing 30 may have a structure in which a mirror is fixedly mounted and integrated in the opening of the housing, unlike a typical structure in which a holder or support for receiving glass is formed in a housing in order to install the mirror in the housing. The glass-integrated housing 30 according to an exemplary embodiment of the present invention reduces the number of necessary components and the weight.

In an inner lateral side of the mirror-integrated housing 30, an installation part 32 for folding and unfolding the mirrors-integrated housing 30 may be integrated with the mirror-integrated housing 30.

The mirror-integrated housing 30 may be connected to a stay 20 to fold and unfold the mirror-integrated housing 30, as well as to adjust an angle of the mirror-integrated housing 30 in up/down and left/right directions.

Figure 5:
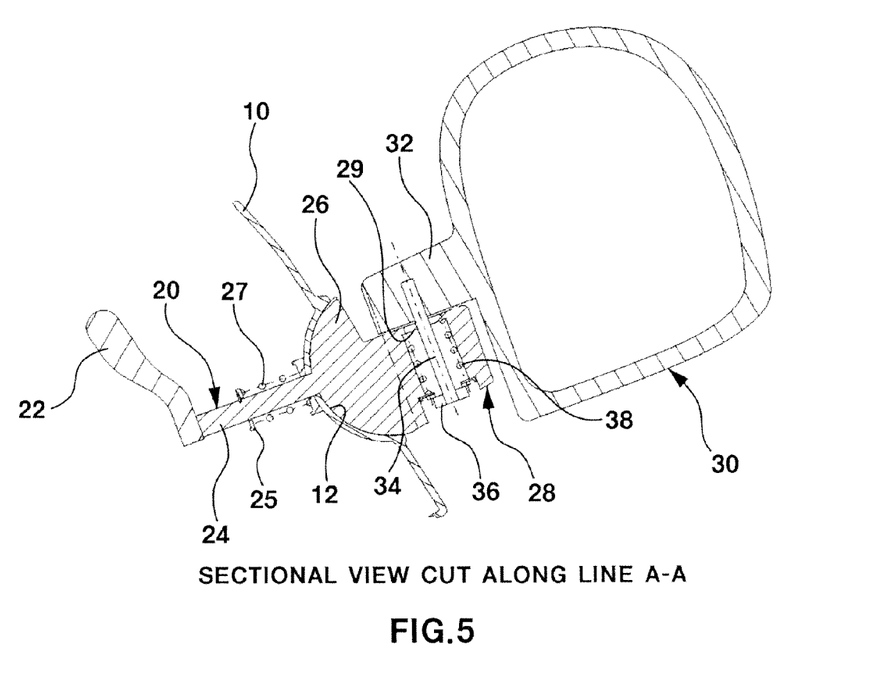
FIG. 5 is a cross-sectional view of the side view mirror cut along a line A-A of FIG. 3.
Figure 6:
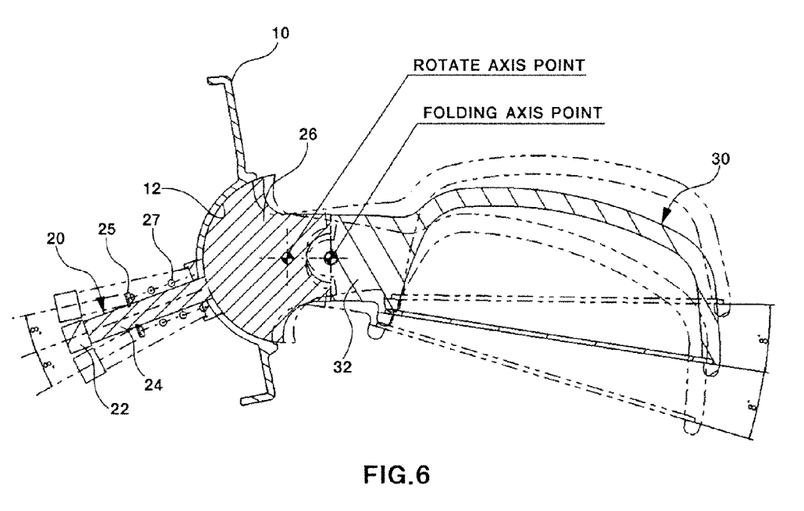
FIG. 6 is a cross-sectional view of the side view mirror cut along a line B-B of FIG. 4.

Referring to FIGS. 5 and 6, the stay 20 may penetrate a cover plate 10 that is mounted on a vehicle body, and may extend across the cover plate 10, in which the inside and outside of the cover plate 10 are divided based on the vehicle body.

More specifically, the stay 20 may include a lever 22 to allow a driver to manipulate a position of the mirror-integrated housing 30 inside the vehicle. A connection bar 24 is integrated with the lever 22 and penetrates the cover plate 10. An up/down/left/right angle adjusting part 26 is integrated with the connection bar 24 at an outer end of the connection bar 24 and allows adjustment of the angle of the mirror-integrated housing 30 in the up/down and left/right directions. A folding supporting part 28 is integrated with the up/down/left/right angle adjusting part 26 at the outer surface of the up/down/left/right angle adjusting part 26 and hinge-connected to the installation part 32 of the mirror-integrated housing 30.

Particularly, the up/down/left/right angle adjusting part 26 may have a hemispherical ball shape that is convex toward an inner side of the cover plate 10 and toward the lever 22. A concave hemispherical groove 12, into and with which the up/down/left/right angle adjusting part 26 is inserted and mounted, may be formed at the inner side of the cover plate 10.

A spring supporting hook 25 may be integrated with the connection bar 24 of the stay 20 on the circumference of the connection bar 24. The diameter of the spring supporting hook 25 may be greater than the outer diameter of the connection bar 24. A first spring 27 into which the connection bar 24 is inserted may be compressively disposed between the spring support hook 25 and the cover plate 10.

Accordingly, the tensile force of the first spring 27 may be applied to the spring support hook 25 of the connection bar 24, so that the stay 20 can be pulled toward the vehicle body, and simultaneously, the up/down/left/right angle adjusting part 26 of the stay 20 is tightly pressed against the surface of the hemispherical groove 12 formed in the inside of the cover plate 10.

The installation part 32 of the mirror-integrated housing 30 may be coupled with the folding supporting part 28 of the stay 20 such that the mirror-integrated housing 30 can be folded and unfolded.

More specifically, in the state where a lower portion of the installation part 32 of the mirror-integrated housing 30 tightly contacts an upper portion of the folding supporting part 28, a bolt-type folding shaft 34 which acts as a rotation axis upon folding and unfolding of the mirror-integrated housing 30 may be inserted from a lower portion of the folding supporting part 28 to the installation part 32 of the housing 30.

A spring coupling groove 29 may be formed in the lower portion of the folding supporting part 29, and a second spring 38 through which the folding shaft 34 is inserted and which is compressively supported by a head 36 of the folding shaft 34 may be inserted in the spring coupling groove 29.

Figure 9:
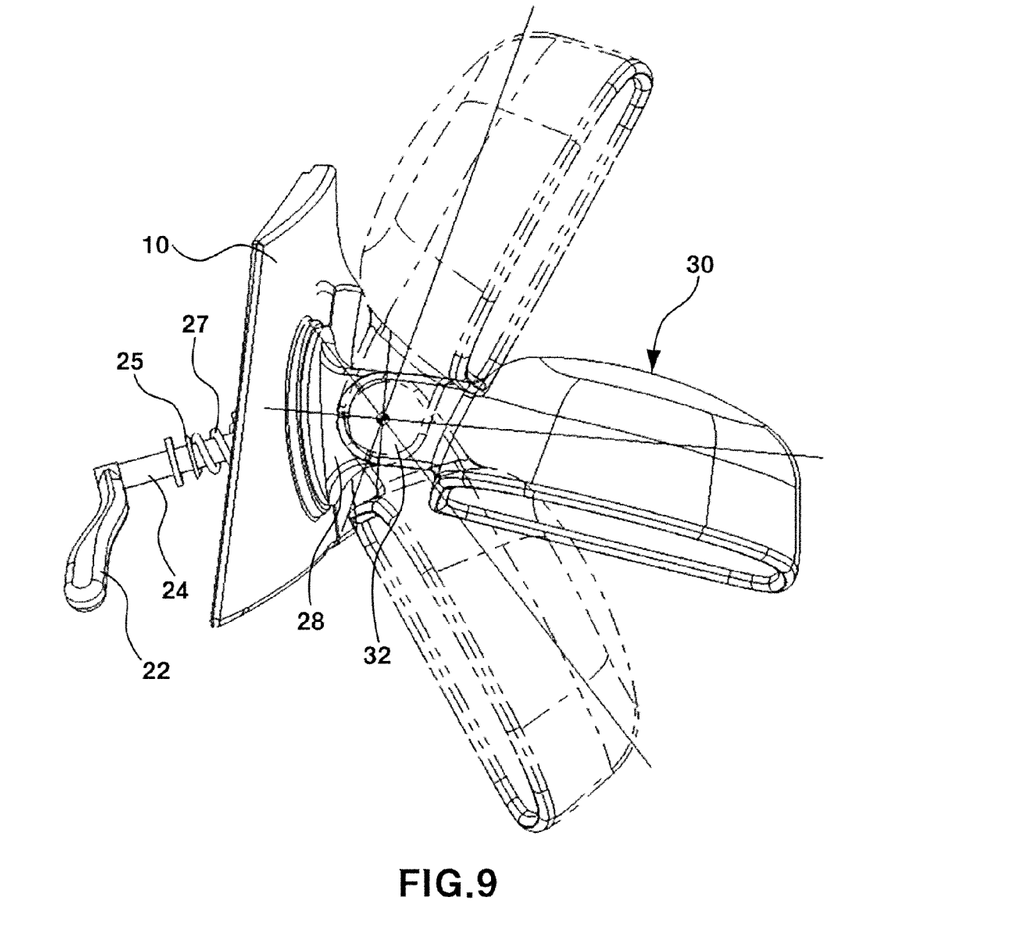
FIG. 9 is a view for describing an operation of folding and unfolding a side view mirror having a rotatable housing according to an embodiment of the present disclosure.

Accordingly, when a driver folds/unfolds the mirror-integrated housing 30 with his/her hand outside the vehicle, the installation part 32 of the mirror-integrated housing 30 may rotate with respect to the folding shaft 34 that is a rotate axis, thereby folding/unfolding the mirror-integrated housing 30, as shown in FIG. 9.

Figure 7:
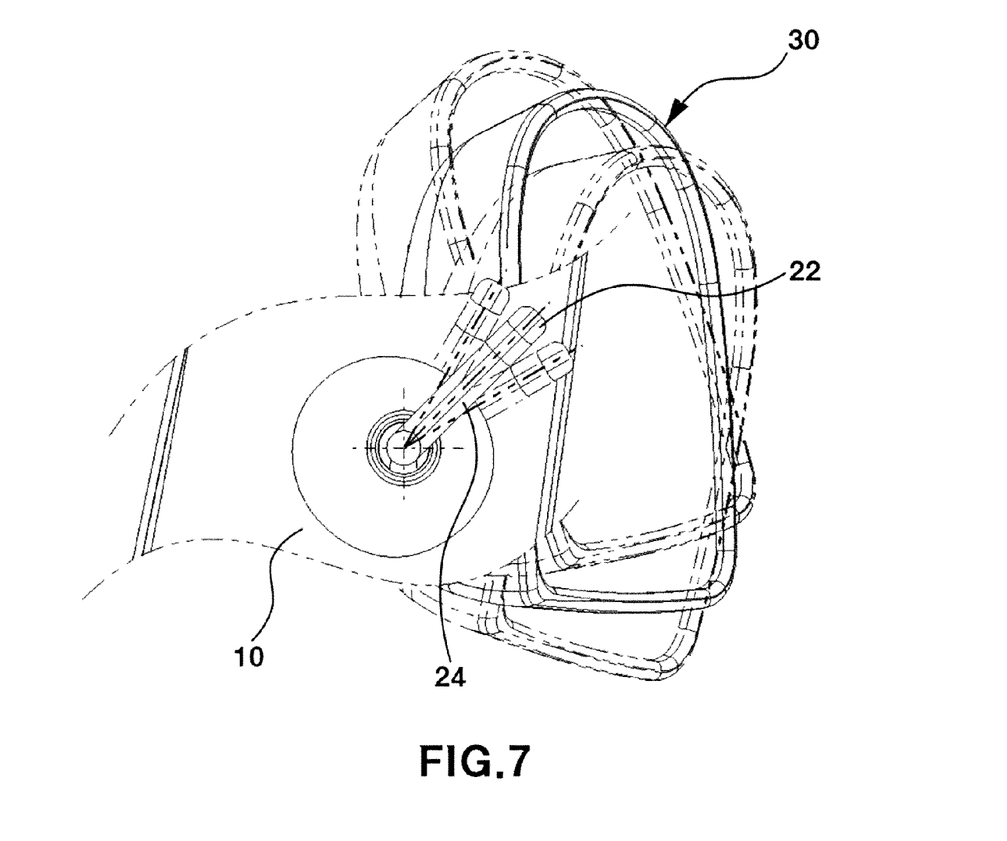
FIG. 7 is a view for describing an operation of adjusting an angle of a side view mirror having a rotatable housing according to an embodiment of the present disclosure in up/down and left/right directions.

When the driver manually moves the lever 22 in the up/down and left/right directions inside the vehicle, the up/down/left/right angle adjusting part 26 having the hemispherical ball shape may move along the surface of the hemispherical groove 12 formed inside of the cover plate 10, and simultaneously, the folding supporting part 28 integrated with the up/down/left/right angle adjusting part 26 may also move in the same direction. Thus, the angle of the mirror-integrated housing 30 connected to the folding supporting part 28 via the installation part 32 is adjusted in the up/down or left/right directions to obtain the driver's desired rearview.

When the mirror-integrated housing 30 is folded and unfolded, it is necessary to hold the mirror-integrated housing 30 at regular angles while preventing the mirror-integrated housing 30 from further rotation.

Figure 8:
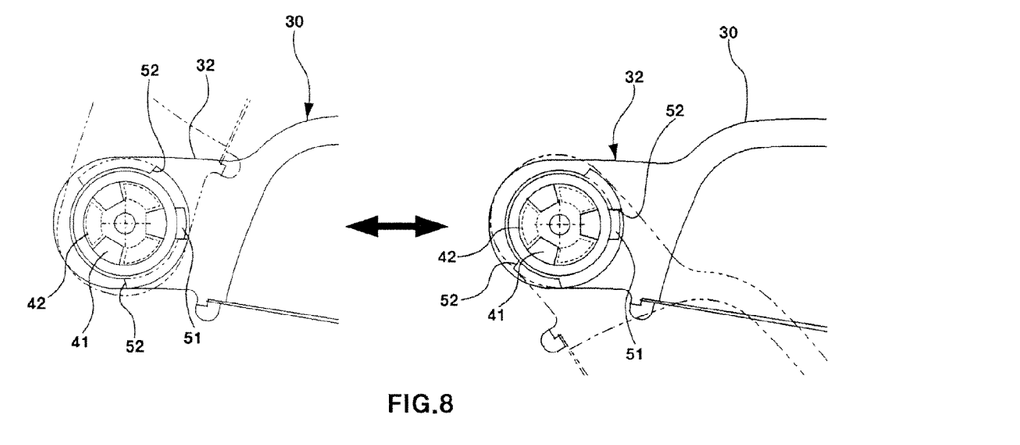
FIG. 8 is a cross-sectional view of the side view mirror cut along a line C-C of FIG. 4.

In order to hold the mirror-integrated housing 30, as shown in FIG. 8, a plurality of first resting protrusions 41 may protrude at intervals of 120° from the upper portion of the folding supporting part 28, and a plurality of second resting protrusions 42 that are arranged between the first resting protrusions 41 may protrude from the lower portion of the installation part 32 of the mirror-integrated housing 30.

Accordingly, when the mirror-integrated housing 30 is folded or unfolded, the second resting protrusions 42 of the installation part 32 climb over the first resting protrusions 41 of the folding supporting part 28, and are placed between the next first resting protrusions 41 to be locked. Therefore, it is possible to prevent the mirror-integrated housing 30 from continuing to rotate and to fix the mirror-integrated housing 30 at a desired angle when the mirror-integrated housing 30 is folded or unfolded.

When the second resting protrusions 42 of the installation part 32 climb over the first resting protrusions 41 of the folding supporting part 28, the second resting protrusions 42 can easily climb over the first resting protrusions 41 since the folding shaft 34 coupled with the installation part 32 is pulled upward while compressing the second spring 38.

Figure 10:
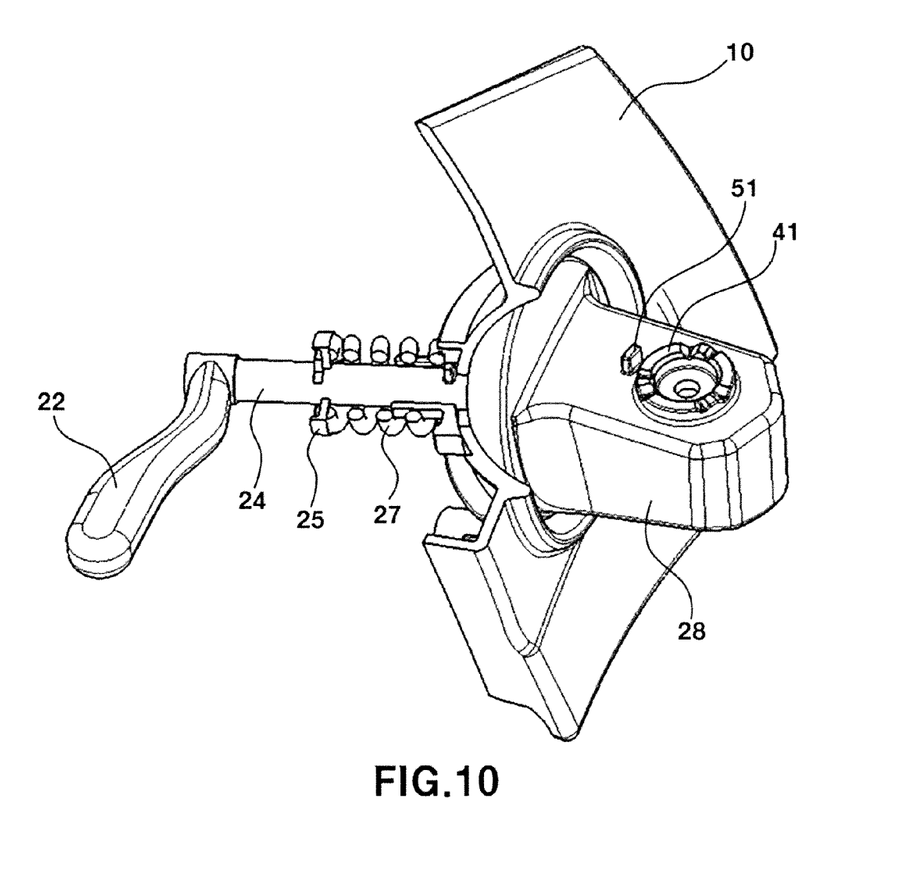
FIG. 10 illustrates an example of a structure of limiting a folding angle of a side view mirror having a rotatable housing according to an embodiment of the present disclosure.

When the mirror-integrated housing 30 is folded or unfolded, folding and unfolding angles of the mirror-integrated housing 30 need to be limited. In order to limit the folding and unfolding angles of the mirror-integrated housing 30, a first folding limiting protrusion 51 to limit the folding angle of the housing 30 may protrude from the outer circumference of the first resting protrusions 41 of the folding supporting part 28. A pair of second folding limiting protrusions 52 having the first folding limiting protrusion 51 in between may protrude from the outer circumference of the second resting protrusions 42 formed in the installation part 32 of the housing 30.

When the mirror-integrated housing 30 is folded or unfolded, movement of the second folding limiting protrusions 52 of the installation part 32 may be limited by the first folding limiting protrusion 51 of the folding supporting part 28 so that the mirror-integrated housing 30 cannot rotate further. Accordingly, as shown in FIG. 10, the mirror-integrated housing 30 can be smoothly folded or unfolded within a limited folding angle range.

As such, by providing mirror-integrated housings for side view mirrors, an angle of each mirror-integrated housing can be adjusted in up/down and left/right directions, and each mirror-integrated housing can be folded or unfolded. A lever is provided for manipulating the mirror-integrated housing inside a vehicle, and thus, a driver can easily adjust an angle of the housing, that is, a view angle of the side mirror to his/her desired angle by manipulating the lever inside the vehicle.

The driver can fold and unfold the mirror-integrated housing outside the vehicle when he/she park or stop the vehicle. Furthermore, since the mirror-integrated hosing can be folded by an external force when a fender bender occurs, pedestrian safety can be improved.

In addition, since a mirror is integrated with a housing, a mirror holder, a support, and the like of the conventional housing to assemble a mirror with the housing are no longer required, thus reducing the number of components and the weight.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A side view mirror having a rotatable housing, the side view mirror comprising:
   a cover plate mounted on an exterior of a vehicle body, wherein an inside and outside of the cover plate are divided based on the vehicle body;
   a stay penetrating the cover plate, comprising: a lever disposed in the inside of the cover plate, an up/down/left/right angle adjusting part connected to the lever through a connection bar, and integrated with the connection bar to be movable in up/down and left/right directions with respect to an outer surface of the cover plate, and a folding supporting part integrated with the up/down/left/right angle adjusting part and connected to the mirror-integrated housing;
   a mirror-integrated housing foldably or unfoldably coupled with the folding supporting part;
   a spring supporting hook integrated with the connection bar on a circumference of the connection bar; and
   a first spring, into which the connection bar is inserted, compressively disposed between the spring support hook and the cover plate,
   wherein an angle of the mirror-integrated housing is adjusted in the up/down and left/right directions by the up/down/left/right angle adjusting part,
   wherein the up/down/left/right angle adjusting part has a hemispherical portion that is convex toward the inside of the cover plate and a non-spherical portion and a concave hemispherical groove with which the hemispherical portion is ball-jointed is formed in the inside of the cover plate,
   wherein the folding supporting part integrates with the up/down/left/right angle adjusting part at the non-spherical portion of the up/down/left/right angle adjusting part.

2. The side view mirror of claim 1, wherein in a state where a lower portion of an installation part formed in an inner lateral side of the mirror-integrated housing tightly contacts an upper portion of the folding supporting part, a folding shaft which acts as a rotation axis of the mirror-integrated housing is disposed inside of the folding supporting part and the installation part of the housing to connect the folding supporting part and the installation part.

3. The side view mirror of claim 1, further comprising:
   a spring coupling groove formed in a lower portion of the folding supporting part; and
   a second spring compressively supported by a head of the folding shaft and inserted in the spring coupling groove.

4. The side view mirror of claim 1, further comprising:
   a plurality of first resting protrusions protruding at a predetermined interval from an upper portion of the folding supporting part; and
   a plurality of second resting protrusions arranged between the first resting protrusions, the plurality of second resting protrusions protruding from a lower portion of an installation part of the mirror-integrated housing.

5. The side view mirror of claim 4, further comprising:
   a first folding limiting protrusion protruding from an outer circumference of the first resting protrusions of the folding supporting part to limit a folding angle of the mirror-integrated housing; and
   a pair of second folding limiting protrusions protruding from an outer circumference of the second resting protrusions of the mirror-integrated housing,
   wherein the first folding limiting protrusion is disposed between the pair of second folding limiting protrusions.

6. The side view mirror of claim 4, wherein the predetermined interval is 120°.

* * * * *